United States Patent
Baumer

(10) Patent No.: US 7,274,315 B2
(45) Date of Patent: Sep. 25, 2007

(54) SCRAMBLED BLOCK ENCODER

(75) Inventor: Howard A. Baumer, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 11/267,184

(22) Filed: Nov. 7, 2005

(65) Prior Publication Data

US 2007/0103344 A1    May 10, 2007

(51) Int. Cl.
    *H03M 7/00*    (2006.01)
(52) U.S. Cl. .................. 341/95; 341/58; 370/473; 370/474
(58) Field of Classification Search .............. 341/58, 341/95
    See application file for complete search history.

(56) References Cited

U.S. PATENT DOCUMENTS

| 5,387,911 | A  | * | 2/1995  | Gleichert et al. | 341/95  |
|-----------|----|---|---------|------------------|---------|
| 6,650,638 | B1 | * | 11/2003 | Walker et al.    | 370/389 |
| 6,718,491 | B1 | * | 4/2004  | Walker et al.    | 714/701 |
| 6,862,701 | B2 | * | 3/2005  | Walker et al.    | 714/715 |
| 7,055,073 | B2 | * | 5/2006  | Walker et al.    | 714/701 |
| 7,064,685 | B1 | * | 6/2006  | Xue et al.       | 341/61  |

FOREIGN PATENT DOCUMENTS

EP    1 133 123 A2    9/2001

OTHER PUBLICATIONS

Szczepanek, Andre, "Physical Coding Sublayer (PCS) for 64B/66B, type 10GBASE-KR", TI, http://www.ieee802.org/3/ap/public/sep05/szczepanek_02_0905.pdf, Sep. 2, 2005, 31 pgs.

McKay et al, "64B/66B Encoder/Decoder", XILINX, XAPP687 (v1.0), http://direct.xilinx.com/bvdocs/appnotes/xapp687.pdf, Nov. 1, 2003, 9 pgs.

"10 Gigabit Ethernet (10GbE)—10 Gbps: IEEE 802.3ae", http://www.infocellar.com/networks/new-tech/GbE/GbE.htm, last modified: Jul. 23, 2004, 9 pgs.

Luckoor, Sowmya S., "Introduction to 10 Gigabit 64b/66b (Clause 49)", University of New Hampshire: InterOperability Laboratory, http://www.iol.unh.edu/services/testing/10gec/training/10GbE_C149.pdf, Oct. 22, 2001, 30 pgs.

(Continued)

*Primary Examiner*—Khai M. Nguyen
(74) *Attorney, Agent, or Firm*—Sterne, Kessler, Goldstein & Fox PLLC

(57) ABSTRACT

A block encoder flexibly encodes K codes to produce an encoded data block. The block encoder receives an unformatted block of 10 Gigabit Media Independent Interface (XGMII) data. The unformatted block of data includes data and/or K characters, both of which can be located in any position of the unformatted block. The block encoder inserts data characters into a first set of slots of the encoded data block. The block encoder encodes K characters to produce corresponding encoded K characters. Each encoded K character includes a link field, a position field and a recoded value field. The encoded K characters are inserted into a second set of slots of the encoded data block. A synchronization header is attached to the encoded data block to distinguish control blocks from pure data blocks. The header and encoded data block are subsequently scrambled in preparation for transmission.

38 Claims, 5 Drawing Sheets

OTHER PUBLICATIONS

European Search Report from European Application No. 06015621.3, 3 pages, mailed May 9, 2007.

*IEEE Standard for Information Technology - Telecommunications and information exchange between systems - Local and metropolitan area networks - Specific requirements, Part 3: Carrier Sense Multiple Access with Collision Detection (CSMA/CD) Access Method and Physical Layer Specifications, Amendment 1: Media Access Control (MAC) Parameters, Physical Layers, and Management Parameters for 10 Gb/s Operation*, IEEE, New York, NY, Aug. 30, 2002, pp. 1-529, XP002426976.

* cited by examiner

SCRAMBLED BLOCK ENCODER

BACKGROUND OF THE INVENTION

1. Field of the Invention

The present invention generally relates to encoding systems. More specifically, the present invention provides the flexible encoding of control codes.

2. Background Art

Data transmission systems often use an embedded clock in a data stream to provide timing information. A transition rich data stream is required for quick and accurate clock recovery. Encoding schemes are used to produce a transition rich output data stream from a given input data stream.

The Institute of Electrical and Electronics Engineers (IEEE) 10 Gbps Ethernet standard specifies a 64-bit/66-bit (64B/66B) coding scheme in IEEE 802.3 Clause (CL) 49. The 64B/66B encoding scheme encodes eight 10 Gbit Media Independent Interface (XGMII) data octets (i.e., 64 bits) into a 66 bit block. The 66 bit block includes a two bit synchronization header and a 64 bit payload.

Generally, multiple XGMII lanes carry data characters and/or control characters (i.e., "K" codes). The 64B/66B encoder of CL 49 imposes restrictions on which lanes can carry certain K codes. Correspondingly, the payload generated by the 64B/66B encoder is similarly restricted. Restricting the positioning of K codes in the received XGMII data and the generated payload limits the capabilities of a data transmission system using such an encoder. Further, the 64B/66B encoder of CL 49 only scrambles the payload of an encoded block and not the synchronization header. As a result, the spectrum of a scrambled block generated by the 64B/66B encoder of CL 49 contains interfering energy spikes.

BRIEF SUMMARY OF THE INVENTION

Accordingly, the present invention provides a block encoder to flexibly encode K codes by not restricting the positioning of K codes in received XGMII data nor restricting the placement of encoded K codes in a generated encoded output. Further, the block encoder of the present invention fully scrambles an encoded payload and associated synchronization header to minimize interference. Additionally, the present invention provides the flexible receipt, descrambling and decoding of flexibly encoded K codes within a fully scrambled encoded data block.

In one embodiment, there is provided a block encoder to flexibly encode K codes to produce an encoded data block. The block encoder receives an unformatted block of 10 Gigabit Media Independent Interface (XGMII) data. The unformatted block of data includes data and/or K characters. Both data and K codes can be located in any position of the unformatted block. The block encoder inserts data characters into a first set of slots of the encoded data block. The block encoder encodes K characters to produce corresponding encoded K characters. Each encoded K character includes a link field, a position field and a recoded value field. The encoded K characters are inserted into a second set of slots of the encoded data block. A synchronization header is attached to the encoded data block to distinguish control blocks from pure data blocks. The synchronization header and encoded data block are subsequently scrambled in preparation for transport over a data transmission system.

Additional features and advantages of the invention will be set forth in the description that follows, and in part will be apparent from the description, or may be learned by practice of the invention. The advantages of the invention will be realized and attained by the structure and particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS/FIGURES

The accompanying drawings illustrate the present invention and, together with the description, further serve to explain the principles of the invention and to enable one skilled in the pertinent art to make and use the invention.

Figure 4:
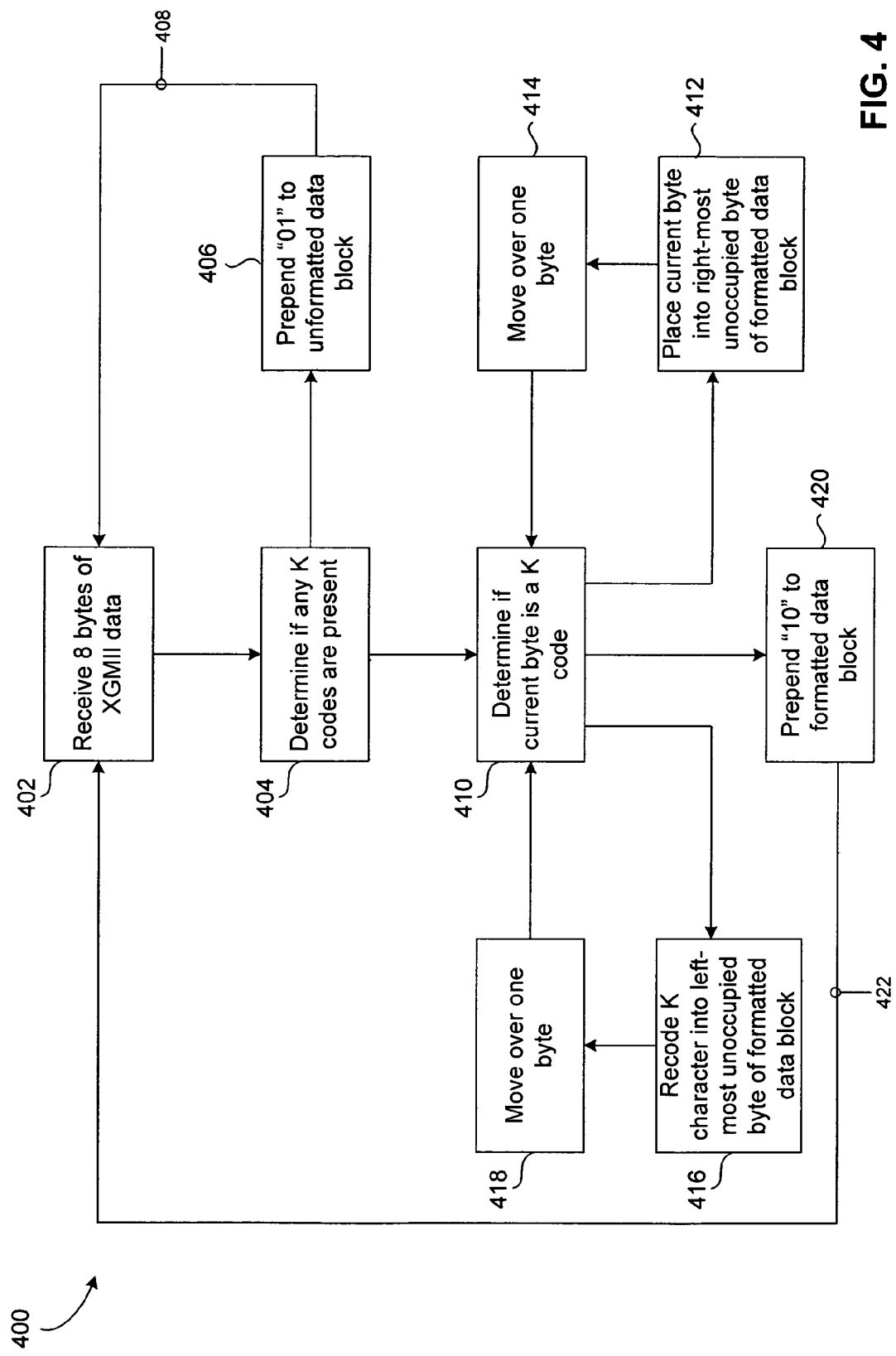

FIG. 4 provides a flowchart that illustrates operational steps for flexibly encoding K characters in accordance with an aspect of the present invention.

Figure 5:
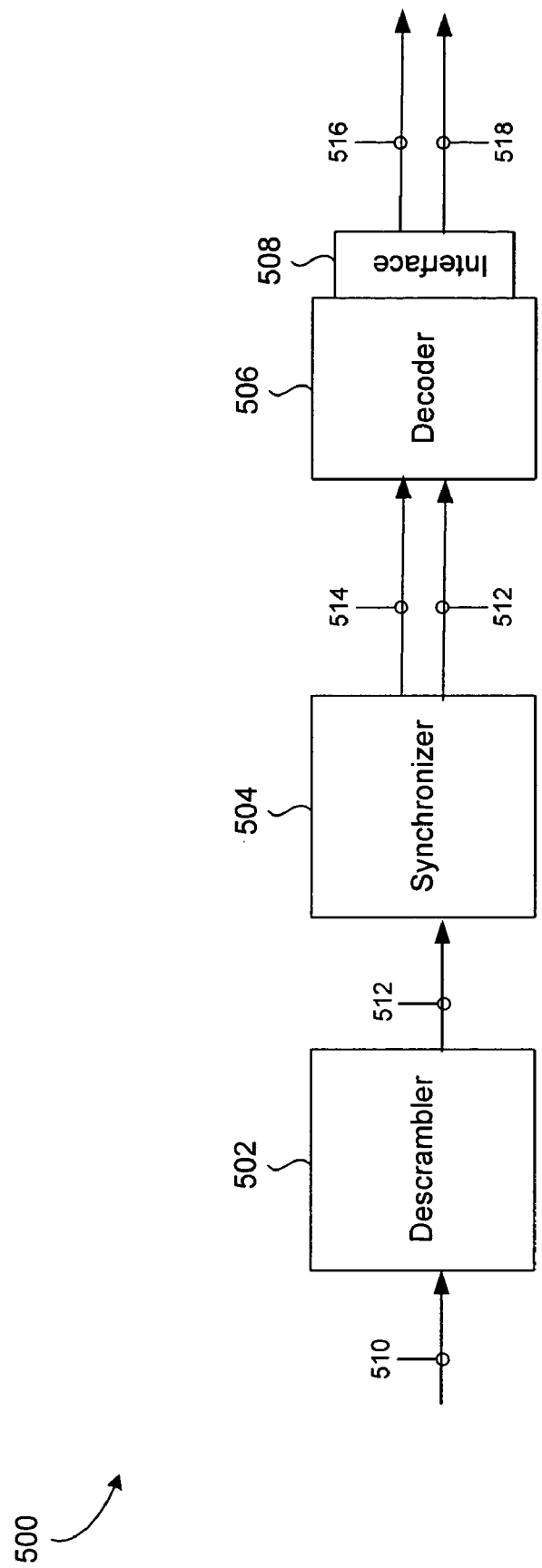

FIG. 5 illustrates a decoding system of the present invention providing the flexible receipt, decoding and transmission of encoded K codes.

DETAILED DESCRIPTION OF THE INVENTION

Many data transmission systems use an embedded clock in a data stream to provide timing information. To ensure quick and accurate clock recovery, a transition rich data stream is required. Encoding schemes are designed to produce a transition rich output data stream from a given input data stream. Encoding schemes are also designed to produce an output data stream that is DC balanced. Other factors that drive the design of encoders include, for example, coding overhead, maximum run length, encoding rate increase and the accommodation of variable line rates.

The 8-bit/10-bit (8B/10B) coding scheme is used to generate an output data stream having an abundance of transitions. 1× and 2× Fibre Channel systems and Gigabit Ethernet systems often employ the 8B/10B coding scheme. The 8B/10B coding scheme converts an eight bit wide data stream of random "1's" and "0's" into a ten bit wide data stream of "1's" and "0's." The 8B/10B coding scheme provides a DC balanced output having a maximum run length of approximately 5.

The overhead of an 8B/10B coder is 20% with an encoding rate increase of 25%. This overhead becomes unacceptable when data rates increase above a few Gbps. In particular, the 8B/10B coder is unacceptable for applications such as 10G Fibre Channel or 10 Gigabit Ethernet. Consequently, data transmission systems operating at very high data rates typically use a coding scheme other than the 8B/10B coding scheme.

The Institute of Electrical and Electronics Engineers (IEEE) 10 Gbps Ethernet standard specifies a 64B/66B coding scheme in IEEE 802.3 Clause (CL) 49, herein incorporated by reference in its entirety. The 64B/66B encoding scheme encodes eight 10 Gbit Media Independent Interface (XGMII) data octets (i.e., 64 bits) into 66 bits. Accordingly, the corresponding 64B/66B decoding scheme converts 66 encoded bits into eight XGMII data octets. The overhead of the 64B/66B coding scheme is approximately 3%.

Figure 1:
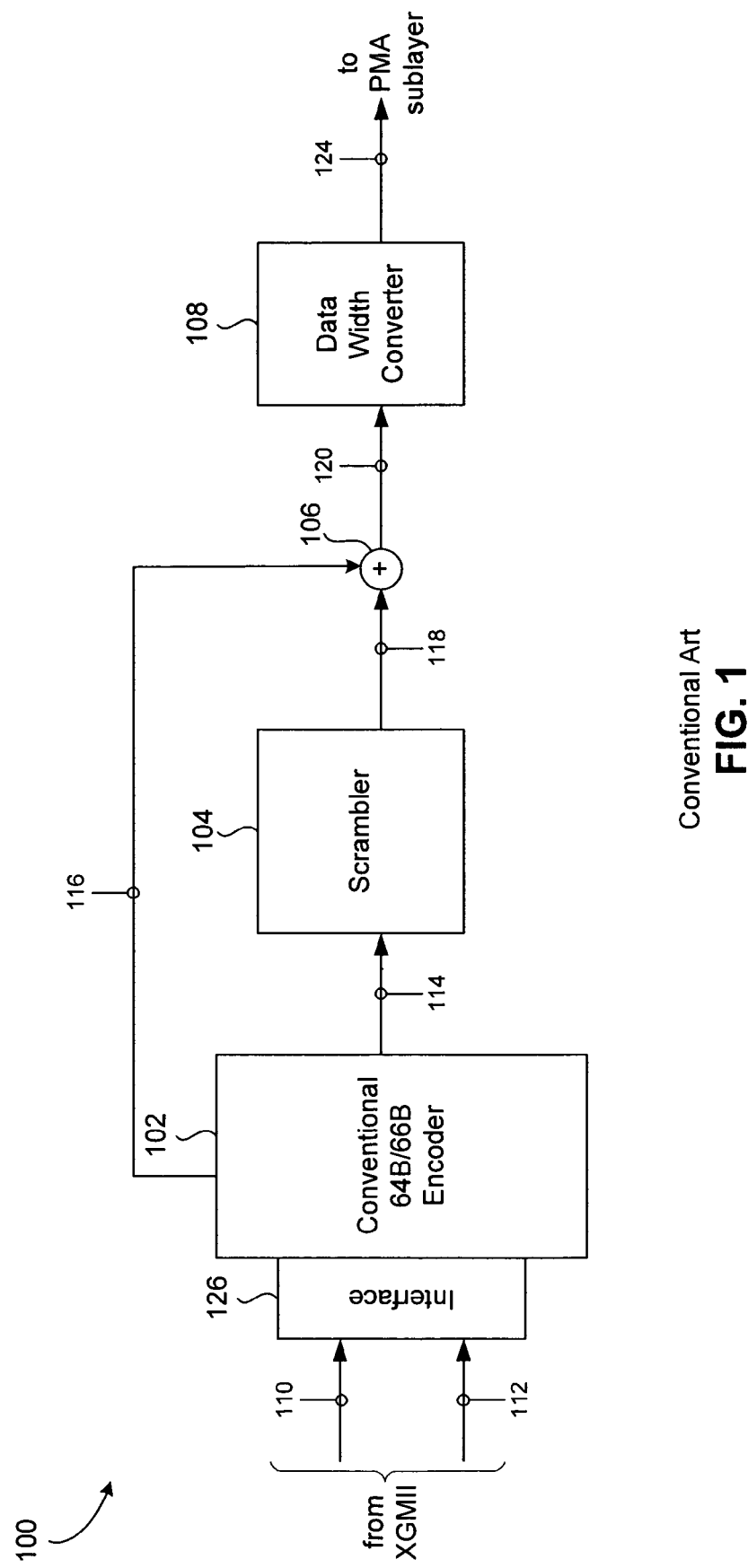
FIG. 1 illustrates a conventional encoding system.

FIG. 1 illustrates a conventional encoding system 100 for implementing the Physical Coding Sublayer (PCS) of a 10GBASE-R Physical Layer Device (PHY). As shown in FIG. 1, the conventional encoding system 100 includes a conventional block encoder 102, a data interface 126, a scrambler 104, a combiner 106 and a data width converter 108. The conventional block encoder 102 implements the conventional 64B/66B coding scheme as specified in IEEE 802.3 CL 49. The conventional 64B/66B encoder receives four parallel lanes of XGMII data 110 (i.e., lanes 0-3) via the data interface 126. Each of the XGMII lanes 110 carries an eight bit (i.e., one byte or octet) character. The conventional 64B/66B encoder also receives four bits of control data 112 (i.e., bits 0-3) via the data interface 126. Each of the control data bits 112 corresponds to one of the XGMII lanes 110.

The types of characters carried by the XGMII lanes 110 include data, control, "start", "terminate" and "ordered set" characters. Collectively, the control, start, terminate and ordered set characters are considered "K" control codes. The conventional 64B/66B encoder 102 can accommodate the reception of data, control and terminate characters on any of the four XGMII lanes 110. However, in accordance with IEEE 802.3 CL 49, the conventional 64B/66B encoder 102 can only accommodate the reception of start and ordered set characters within certain positions of the four XGMI lanes 110. Specifically, the start and ordered set characters can only be received or located on the first octet (i.e., the first lane) of the four XGMII lanes 110.

The conventional 64B/66B encoder 102 continuously encodes eight data octets (i.e., two successive transfers of XGMII characters) received over the XGMII lanes 110 into a 66 bit block. The 66 bit block comprises a synchronization header 116 and a payload 114. The synchronization header is a two bit field. Accordingly, the remaining 64 bits of the 66 bit encoded block is considered the payload 114. The 66 bit block (collectively, the header 116 and the payload 114) generated by the conventional 64B/66B encoder 102 is either a data block or a control block. Data blocks are comprised entirely of data characters. Control blocks contain at least one character other than a data character (e.g., a terminate character, a start character, etc.)

Data blocks and control blocks are distinguished by the two bit synchronization header 116. Data blocks have a prepended header 116 of "01." In contrast, control blocks are identified by a "10" header 116. The header 116 of an encoded block also aids synchronization since the header 116 is the only portion of a block with a guaranteed transition.

The control bits 112 carry a "0" on each of the bit positions associated with the XGMII lanes 110 that carry a data character. Conversely, the control bits 112 carry a "1" on each of the bit positions associated with the XGMII lanes 110 that carry a K character. As previously mentioned, the positioning of the characters received over the four XGMII lanes 110 is strictly regulated by the conventional 64B/66B encoder 102. Consequently, the range of possible inputs (i.e., variable octet sequences) received by the conventional 64B/66B encoder 102 is limited. As a result, the conventional 64B/66B encoder generates a very specific 64 bit payload 114 based on the characters received on the XGMII lanes 110.

Table 1, below, illustrates the conventional formatting of the 66 bit encoded blocks generated by the conventional 64B/66B encoder 102. The "Input Data" column shows the eight characters received over the XGMII lanes 110. From left to right, the first four characters represent the contents of a first transfer of XGMII data. The second four characters represent the contents of a second (consecutive) transfer of XGMII data. As shown in Table 1, the input data includes data characters (D), control characters (C), terminate characters (T), start characters (S) and ordered-set characters (O).

TABLE 1

Conventional 64B/66B Block Formats (from IEEE 802.3 CL 49)

| Input Data | Sync | Block Payload | | | | | | | |
|---|---|---|---|---|---|---|---|---|---|
| Bit Position: | 0 1 | 2 | | | | | | | 65 |
| Data Block Format: | | | | | | | | | |
| $D_0 D_1 D_2 D_3/D_4 D_5 D_6 D_7$ | 01 | $D_0$ | $D_1$ | $D_2$ | $D_3$ | $D_4$ | $D_5$ | $D_6$ | $D_7$ |
| Control Block Formats: | | Block Type Field | | | | | | | |
| $C_0 C_1 C_2 C_3/C_4 C_5 C_6 C_7$ | 10 | 0x1e | $C_0$ | $C_1$ | $C_2$ | $C_3$ | $C_4$ | $C_5$ | $C_6$ | $C_7$ |
| $C_0 C_1 C_2 C_3/O_4 D_5 D_6 D_7$ | 10 | 0x2d | $C_0$ | $C_1$ | $C_2$ | $C_3$ | $O_4$ | $D_5$ | $D_6$ | $D_7$ |
| $C_0 C_1 C_2 C_3/S_4 D_5 D_6 D_7$ | 10 | 0x33 | $C_0$ | $C_1$ | $C_2$ | $C_3$ | 1s | $D_5$ | $D_6$ | $D_7$ |
| $O_0 D_1 D_2 D_3/S_4 D_5 D_6 D_7$ | 10 | 0x66 | $D_1$ | $D_2$ | $D_3$ | $O_0$ | 1s | $D_5$ | $D_6$ | $D_7$ |
| $O_0 D_1 D_2 D_3/O_4 D_5 D_6 D_7$ | 10 | 0x55 | $D_1$ | $D_2$ | $D_3$ | $O_0$ | $O_4$ | $D_5$ | $D_6$ | $D_7$ |
| $S_0 D_1 D_2 D_3/D_4 D_5 D_6 D_7$ | 10 | 0x78 | $D_1$ | $D_2$ | $D_3$ | $D_4$ | $D_5$ | $D_6$ | $D_7$ |
| $O_0 D_1 D_2 D_3/C_4 C_5 C_6 C_7$ | 10 | 0x4b | $D_1$ | $D_2$ | $D_3$ | $O_0$ | $C_4$ | $C_5$ | $C_6$ | $C_7$ |
| $T_0 C_1 C_2 C_3/C_4 C_5 C_6 C_7$ | 10 | 0x87 | 1s | $C_1$ | $C_2$ | $C_3$ | $C_4$ | $C_5$ | $C_6$ | $C_7$ |
| $D_0 T_1 C_2 C_3/C_4 C_5 C_6 C_7$ | 10 | 0x99 | $D_0$ | 1s | $C_2$ | $C_3$ | $C_4$ | $C_5$ | $C_6$ | $C_7$ |
| $D_0 D_1 T_2 C_3/C_4 C_5 C_6 C_7$ | 10 | 0xaa | $D_0$ | $D_1$ | 1s | $C_3$ | $C_4$ | $C_5$ | $C_6$ | $C_7$ |
| $D_0 D_1 D_2 T_3/C_4 C_5 C_6 C_7$ | 10 | 0xb4 | $D_0$ | $D_1$ | $D_2$ | 1s | $C_4$ | $C_5$ | $C_6$ | $C_7$ |
| $D_0 D_1 D_2 D_3/T_4 C_5 C_6 C_7$ | 10 | 0xcc | $D_0$ | $D_1$ | $D_2$ | $D_3$ | 1s | $C_5$ | $C_6$ | $C_7$ |
| $D_0 D_1 D_2 D_3/D_4 T_5 C_6 C_7$ | 10 | 0xd2 | $D_0$ | $D_1$ | $D_2$ | $D_3$ | $D_4$ | 1 | $C_6$ | $C_7$ |
| $D_0 D_1 D_2 D_3/D_4 D_5 T_6 C_7$ | 10 | 0xe1 | $D_0$ | $D_1$ | $D_2$ | $D_3$ | $D_4$ | $D_5$ | 1 | $C_7$ |
| $D_0 D_1 D_2 D_3/D_4 D_5 D_6 T_7$ | 10 | 0xff | $D_0$ | $D_1$ | $D_2$ | $D_3$ | $D_4$ | $D_5$ | $D_6$ | |

For a given input data block, a corresponding synchronization header and a block payload is generated. A synchronization header of "01" is used to identify a block payload comprising all data characters (i.e., the encoded data block). A synchronization header of "10" is used to identify all remaining possible block payloads (i.e., the set of encoded control blocks). For control blocks, the conventional 64B/

66B encoder 102 generates an eight bit "Block Type Field." The block type field identifies the type of control block generated and the format of the payload.

Start (S) and terminate (T) characters are implied by the block type field. Therefore, start (S) and terminate (T) characters are not directly included in a corresponding payload. Specifically, the locations of start (S) and terminate (T) characters are encoded as variable length strings of "1's" and are ignored upon receipt. Control characters (C) are encoded into a seven bit field and ordered-set characters (O) are encoded into a four bit field. Table 1 shows bit positions and field positions with the least most significant bit on the left. Further, hexadecimal numbers are shown in normal hexadecimal.

Table 2, below, illustrates the control characters supported by the conventional 64B/66B encoder 102. Each control character corresponds to a K code of the 8B/10B code. As previously mentioned, many control codes can only be received and therefore transmitted in certain field positions. For example, idle characters (/I/) can be received on any lane ($C_0$-$C_7$ in Table 1) while start characters (ISI) can only be sent on a first octet ($S_0$ or $S_4$ in Table 1). The sequence ordered set and the signal ordered set are types of ordered-set characters (O). As shown in Table 1, these codes can only be sent on the first octet ($O_0$ or $O_4$). The ordered-set codes are used to extend the ability to send control and status information. For example, the ordered set codes are used to send local and remote fault indicators.

Tables 1 and 2 show that many of the K codes (e.g., the ordered-set codes) received by the conventional 64B/66B encoder 102 are restricted to certain acceptable locations with the XGMII lanes 110. Further, these position-regulated K codes must be encoded into very specific locations within a corresponding payload 114. As a result, the reception, encoding and transmission of K codes by the conventional 64B/66B encoder 102 is highly restrictive.

as specified in IEEE 802.3 CL 49. The scrambled payload 118 is then combined with the synchronization header 116 using the combiner 106 to form a scrambled output 120. Specifically, the synchronization header is prepended to the scrambled payload 118.

The scrambled output 120 is then provided to the data width converter 108. The data width converter 120 adapts the 66 bit scrambled payload to a width specified by or used by an attached Physical Medium Attachment (PMA) sublayer device to produce a transmission output 124. The width of the transmission output 124 is smaller than the width of the 66 bit scrambled output 120. For example, the width of the output 124 can be 16 bits.

As previously discussed, the conventional 64B/66B encoder 102 imposes restrictions on what portions of the XGMII lanes 110 can carry certain K codes. Correspondingly, the payload 114 generated by the conventional 64B/66B encoder 102 is similarly restricted. Restricting the positioning of K codes in the received XGMII lanes 110 and the encoded K codes in the payload 114 limits the capabilities of the data transmission system in which the encoding system 100 operates. Specifically, the encoding system 100 cannot handle any special placing of K codes (e.g., starts codes and ordered-set codes). Further, the encoding system 100 cannot accommodate any control codes or octet sequences not specified by the IEEE 802.3 standard.

Additionally, the encoding system 100 only scrambles the payload 114 of a block generated by the conventional 64B/66B encoder 102 and not the synchronization header 116. As a result, the spectrum of the scrambled output 118 includes energy spikes that can cause electromagnetic interference. Further, the energy spikes can cause resonance problems at a receiver and enhance jitter, thereby making timing, frame and bit recovery more difficult.

TABLE 2

Control Characters (from IEEE 802.3 CL 49)

| Control Character | Notation | XGMII Control Code | 10GBASE-R Control Code | 10GBASE-R O Code | 8B/10B Code |
|---|---|---|---|---|---|
| idle | /I/ | 0x07 | 0x00 | | K28.0 or 28.3 or K28.5 |
| start | /S/ | 0xfb | Encoded by block type field | | K27.7 |
| terminate | /T/ | 0xfd | Encoded by block type field | | K29.7 |
| error | /E/ | 0xfe | 0x1e | | K30.7 |
| Sequence ordered_set | /Q/ | 0x9c | Encoded by block type field plus O code | 0x0 | K28.4 |
| reserved0 | /R/ | 0x1c | 0x2d | | K28.0 |
| reserved1 | | 0x3c | 0x33 | | K28.1 |
| reserved2 | /A/ | 0x7c | 0x4b | | K28.3 |
| reserved3 | /K/ | 0xbc | 0x55 | | K28.5 |
| reserved4 | | 0xdc | 0x66 | | K28.6 |
| reserved5 | | 0xf7 | 0x78 | | K23.7 |
| Signal ordered_set | /Fsig/ | 0x5c | Encoded by block type field plus O code | 0xF | K28.2 |

Returning to FIG. 1, the encoded payload 114 generated by the conventional 64B/66B encoder 102 is provided to the scrambler 104. The scrambler 104 scrambles the 64 bit payload 114 and generates a 64 bit scrambled payload 118. The scrambler 104 is a self-synchronizing scrambler. Further, the scrambler 104 implements the scrambler polynomial:

$$G(x)=1+x^{39}+x^{58} \quad \text{(Eq. 1)}$$

Therefore, what is needed is an encoding system that does not restrict the positioning of K codes received on XGMII lanes nor restricts the placing of encoded K codes in a generated encoded output. Specifically, the encoding systems should accept and encode any K code residing in any lane of XGMII data. Further, the encoding system should reduce the introduction of energy spikes within the spectrum of the generated output.

Figure 2:
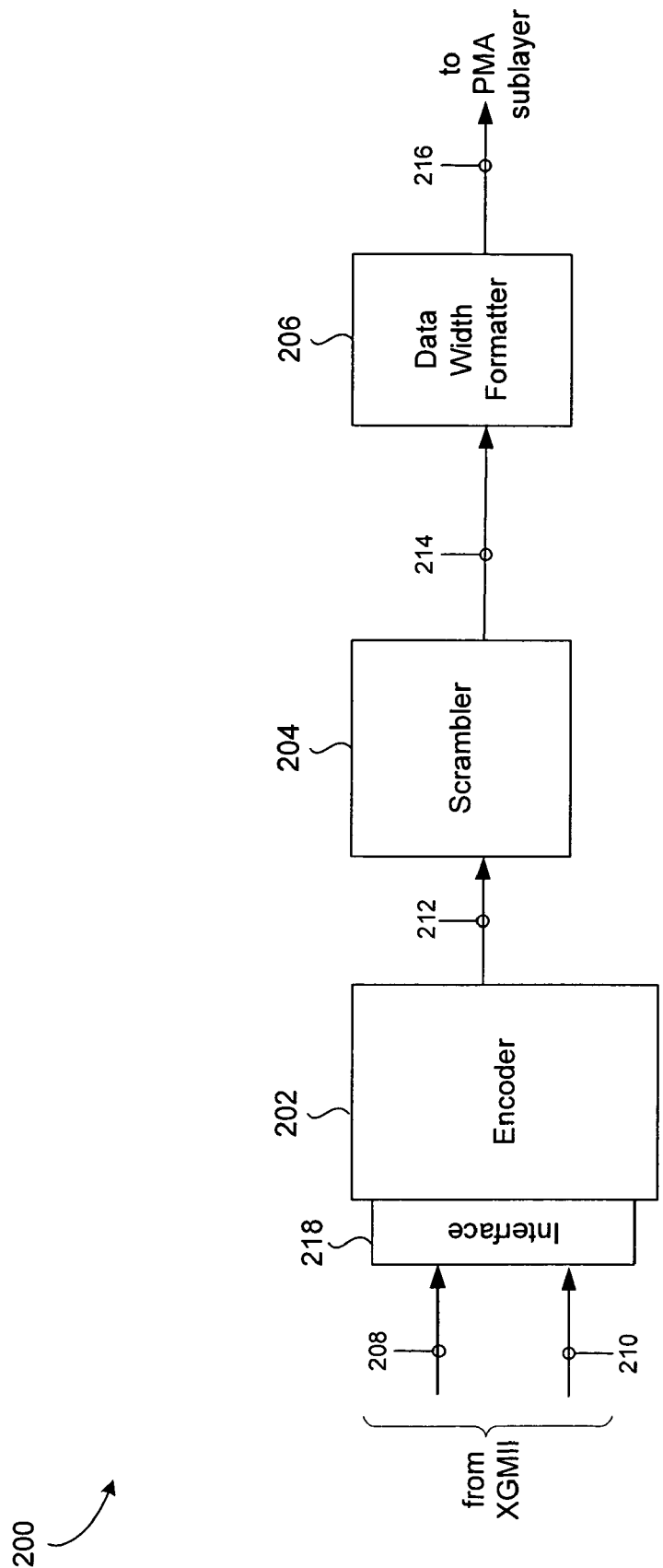
FIG. 2 illustrates an encoding system of the present invention providing the flexible receipt, encoding and transmission of K codes.

FIG. 2 illustrates an encoding system 200 of the present invention. The encoding system 200 provides the flexible receipt, encoding and transmission of K codes. Further, the encoding system 200 fully scrambles a generated output to reduce energy spikes.

As shown in FIG. 2, the encoding system 200 includes an encoder 202, a data interface 218, a scrambler 204 and a data width formatter 206. The data interface 218 or a portion thereof can be incorporated into the encoder 202. Further, combinations of the constituent components of the encoding system 200 can be incorporated together into a "block encoder." The encoder 202 receives XGMII data over four parallel XGMII lanes 208 via the data interface 218. Each XGMII data lane 208 receives an eight bit character. The encoder 202 also receives corresponding XGMII control data over an XGMII control link 210. The XGMII link 210 carries four bits with each bit corresponding to a different XGMII data lane.

The encoder 202 converts eight octets of XGMII data (i.e., two successive transfers of XGMII characters—64 bits) received over the XGMII data lanes 208 into a 66 bit encoded block 212. The encoded block 212 includes a two bit synchronization header and a 64 bit payload. The encoded block 212 is provided to the scrambler 204. The scrambler 204 scrambles all 66 bits of the encoded block 212 to produce a scrambled encoded block 214. The scrambled encoded block 214 is provided to the data width formatter 206. The data width formatter 216 converts the scrambled encoded block 214 into a reduced width data block 216. Specifically, the data width formatter 216 adapts the width of the scrambled encoded block 214 to a width of the PMA sublayer device connected to the data width formatter 216.

The encoder 202 does not impose any restrictions on the location of any K code received on the XGMII data lanes 208. That is, the encoder 202 can accommodate all K codes on all four XGMII data lanes 208. Consequently, any of the eight octets used by the encoder 202 to produce a corresponding output (i.e., the encoded block 212) can be a data character ($D_0$-$D_7$) or a K character ($K_0$-$K_7$). The eight octets received by the encoder 202 can be considered an unformatted block of 64 bits of data. The encoder 202 encodes the received unformatted block of data to generate the 66 bit encoded data block 212.

During operation of the encoding system 200, the encoder 202 receives eight octets of XGMII data via the data interface 218. The encoder 202 also receives eight bits of corresponding XGMII control data via the data interface 218. Each control bit received over the control link 210 can be used to determine if a corresponding lane of XGMII data 208 is carrying a data character or a K character.

Data characters received over the XGMII lanes 208 are placed into an eight bit field or slot of the formatted output data or encoded block 212. That is, data characters are directly replicated, copied or moved to a corresponding eight bit field within the encoded block 212 without further processing or manipulation.

Figure 3:
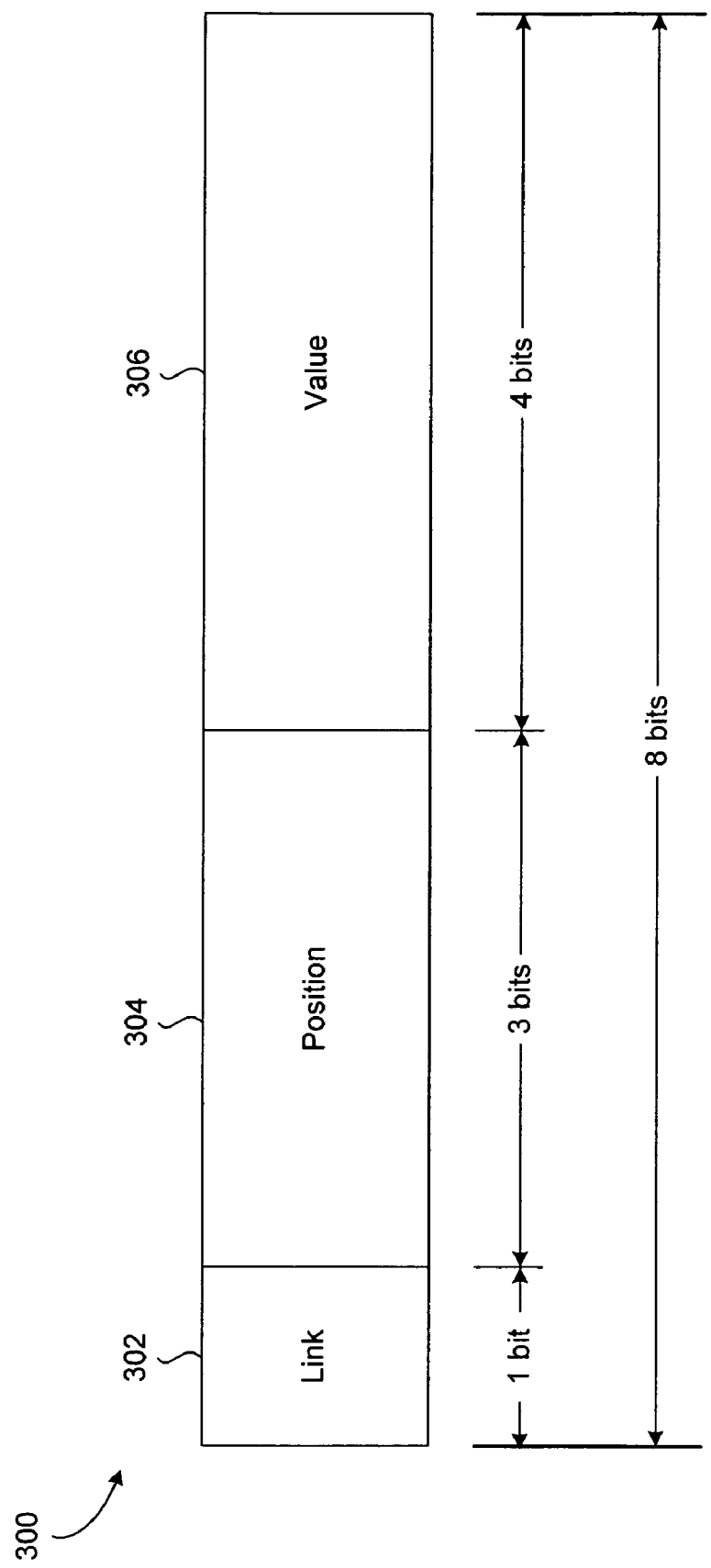
FIG. 3 illustrates a template for recoding K codes in accordance with an aspect of the present invention.

K characters received over the XGMII lanes 208 are recoded according to an aspect of the present invention. FIG. 3 illustrates a template 300 used for recoding a received eight bit K character. The template 300 is eight bits wide and includes a link field 302, a position field 304 and a recoded value field 306. The link indicator 302 is a one bit indicator that specifies whether more recoded K codes are located within the encoded block 212. The position indicator 304 is a three bit indicator that specifies the octet or lane of the XGMII lanes 208 that carried the K character. That is, the position indicator 304 specifies the original location of the received K character. The recoded value indicator 306 is a four bit indicator or encoded version of the K code type. Table 3, below, is an example of a K code look-up table. Table 3 illustrates the 14 possible K codes that can be received over the XGMII lanes 208 and their corresponding recoded values 306. As shown, each eight bit K character is recoded into a unique four bit value. It is to be appreciated by those skilled in the art(s) that other four bit codes can be used to encode the 14 possible K codes without diverting from the spirit and scope of the present invention.

TABLE 3

K Code Look-Up Table

| Control Code | K code | Recoded Value | | | |
|---|---|---|---|---|---|
| /I/ | K07.0 | 0 | 0 | 1 | 1 |
| /R/ | K28.0 | 0 | 0 | 0 | 0 |
|  | K28.1 | 1 | 0 | 0 | 0 |
| /SOM/ | K28.2 | 0 | 1 | 1 | 0 |
| /A/ | K28.3 | 0 | 0 | 1 | 0 |
|  | K28.4 | 1 | 0 | 1 | 1 |
| /K/ | K28.5 | 0 | 1 | 0 | 1 |
|  | K28.6 | 1 | 0 | 1 | 0 |
|  | K28.7 | 1 | 1 | 0 | 0 |
|  | K23.7 | 1 | 0 | 0 | 1 |
| /S/ | K27.7 | 0 | 1 | 0 | 0 |
| /T/ | K29.7 | 0 | 0 | 0 | 1 |
| /E/ | K30.7 | 0 | 1 | 1 | 1 |
|  | Others | 1 | 1 | 1 | 1 |

The encoder 202 generates a two bit synchronization header for each encoded payload. A synchronization header of "10" is included within each encoded block 212 that contains an encoded K code. A synchronization header of "01" is included within each encoded block 212 that is devoid of K codes (i.e., contains only data characters). Attaching the synchronization header to the encoded payload increases the length of the encoded block 212 to 66 bits.

Returning to FIG. 2, all 66 bits of the encoded block 212 are scrambled by the scrambler 204. The scrambler 204 can be a self-synchronizing scrambler. Further, the scrambler 204 can implement the scrambler polynomial:

$$G(x) = 1 + x^{39} + x^{58} \qquad \text{(Eq. 1)}$$

as specified in IEEE 802.3 CL 49. The spectrum of the scrambled encoded block 214 is improved by scrambling all 66 bits of the encoded block 212. Specifically, energy spikes within the spectrum of the scrambled encoded block 214 are reduced and energy is spread out more evenly over a range of frequencies.

Table 4, below, illustrates the relationship of unformatted data received on XGMII lanes 208 and reformatted data comprising the encoded block 212. The unformatted data shown in Table 4 is eight bytes wide and comprises either data characters ($D_0$-$D_7$) or K characters ($K_0$-$K_7$). The most significant byte of the unformatted data and formatted data are the left most bytes of each block. Data characters and K characters can reside in any byte or lane within the unformatted block of data. Accordingly, 256 variations of unformatted data blocks are possible. Table 4 illustrates only a small portion of the possible variations of unformatted data blocks for simplicity.

The formatted data blocks shown in Table 4 include eight "slots." Each slot is eight bytes wide and can contain either recoded K characters or directly reproduced data characters. Accordingly, a length of an encoded data block (not including the synchronization header) is equal to a length of the unformatted block of data. Data characters, if present, occupy a first set of slots within an encoded data block. The first set of slots occupies a contiguous right-most portion of an encoded data block. K characters, if present, occupy a second set of slots within an encoded data block. The second set of slots occupies a contiguous left-most portion of an encoded data block. The number of slots with the first and second sets of slots is based on the number of data characters and K characters, respectively, in the original unformatted data block. The column labeled "S" represents the synchronization header of an encoded data block as discussed above. The columns labeled "L" and "P" represent the link indicator field 302 the position indicator field 304, respectively, as depicted in FIG. 3.

At step 402, eight bytes of XGMII data are received or read. The eight bytes of XGMII data are received over two successive transfers of 4 bytes of XGMII data. The eight bytes of received XGMII data comprises an unformatted data block. The unformatted data block can contain either control information (e.g., K codes) or data information (e.g., D codes) in any of the eight byte positions. For example, start and ordered-set codes can reside in any byte position. Eight bits of XGMII control are also received. Specifically, four bits of XGMII control information is received with each four byte transfer of XGMII data. Each control bit is associated with a byte or lane of XGMII data received.

At step 404, the unformatted data block is reviewed to determine the presence of any control codes. Specifically,

TABLE 4

Generated Encoded Data Blocks

| Unformatted Data Blocks | S | L | P | E(Kn) | Encoded Data Blocks | | |
|---|---|---|---|---|---|---|---|
| D7 D6 D5 D4 D3 D2 D1 D0 | 01 | | | D7 | D6 | D5 | D4 |
| D7 D6 D5 D4 D3 D2 D1 K0 | 10 | 0 | 000 | E(K0) | D7 | D6 | D5 |
| D7 D6 D5 D4 D3 D2 K1 D0 | 10 | 0 | 001 | E(K1) | D7 | D6 | D5 |
| D7 D6 D5 D4 D3 D2 K1 K0 | 10 | 1 | 000 | E(K0) | 0 001 E(K1) | D7 | D6 |
| D7 D6 D5 D4 D3 K2 D1 D0 | 10 | 0 | 010 | E(K2) | D7 | D6 | D5 |
| D7 D6 D5 D4 D3 K2 D1 K0 | 10 | 1 | 000 | E(K0) | 0 010 E(K2) | D7 | D6 |
| . | | | | . | | | |
| . | | | | . | | | |
| . | | | | . | | | |
| K7 K6 K5 K4 K3 D2 K1 D0 | 10 | 1 | 001 | E(K1) | 1 011 E(K3) | 1 100 E(K4) | 1 101 E(K5) |
| K7 K6 K5 K4 K3 D2 K1 K0 | 10 | 1 | 000 | E(K0) | 1 001 E(K1) | 1 011 E(K3) | 1 100 E(K4) |
| K7 K6 K5 K4 K3 K2 D1 D0 | 10 | 1 | 010 | E(K2) | 1 011 E(K3) | 1 100 E(K4) | 1 101 E(K5) |
| K7 K6 K5 K4 K3 K2 D1 K0 | 10 | 1 | 000 | E(K0) | 1 010 E(K2) | 1 011 E(K3) | 1 100 E(K4) |
| K7 K6 K5 K4 K3 K2 K1 D0 | 10 | 1 | 001 | E(K1) | 1 010 E(K2) | 1 011 E(K3) | 1 100 E(K4) |
| K7 K6 K5 K4 K3 K2 K1 K0 | 10 | 1 | 000 | E(K0) | 1 001 E(K1) | 1 010 E(K2) | 1 011 E(K3) |

| Unformatted Data Blocks | Encoded Data Blocks | | | |
|---|---|---|---|---|
| D7 D6 D5 D4 D3 D2 D1 D0 | D3 | D2 | D1 | D0 |
| D7 D6 D5 D4 D3 D2 D1 K0 | D4 | D3 | D2 | D1 |
| D7 D6 D5 D4 D3 D2 K1 D0 | D4 | D3 | D2 | D0 |
| D7 D6 D5 D4 D3 D2 K1 K0 | D5 | D4 | D3 | D2 |
| D7 D6 D5 D4 D3 K2 D1 D0 | D4 | D3 | D1 | D0 |
| D7 D6 D5 D4 D3 K2 D1 K0 | D5 | D4 | D3 | D1 |
| . | | | | |
| . | | | | |
| . | | | | |
| K7 K6 K5 K4 K3 D2 K1 D0 | 1 110 E(K6) | 0 111 E(K7) | D2 | D0 |
| K7 K6 K5 K4 K3 D2 K1 K0 | 1 101 E(K5) | 1 110 E(K6) | 0 111 E(K7) | D2 |
| K7 K6 K5 K4 K3 K2 D1 D0 | 1 110 E(K6) | 0 111 E(K7) | D1 | D0 |
| K7 K6 K5 K4 K3 K2 D1 K0 | 1 101 E(K5) | 1 110 E(K6) | 0 111 E(K7) | D1 |
| K7 K6 K5 K4 K3 K2 K1 D0 | 1 101 E(K5) | 1 110 E(K6) | 0 111 E(K7) | D0 |
| K7 K6 K5 K4 K3 K2 K1 K0 | 1 100 E(K4) | 1 101 E(K5) | 1 110 E(K6) | 0 111 E(K7) |

FIG. 4 provides a flowchart 400 that illustrates operational steps for flexibly encoding K characters in accordance with an aspect of the present invention. Specifically, the flowchart 400 illustrates a method for generating the formatted data (encrypted block 212) from the unformatted data (data received on XGMII lanes 208) as depicted in Table 4. The flowchart 400 implements the recoding of K code characters as discussed above and illustrated in FIG. 3. Overall, the flowchart 400 describes how each slot of an encoded data block is populated based on the contents of an unformatted block of data, as shown in Table 4. The invention is not limited to this operational description. Rather, it will be apparent to persons skilled in the relevant art(s) from the teachings herein that other operational control flows are within the scope and spirit of the present invention. In the following discussion, the steps in FIG. 4 are described.

each byte of XGMII data is reviewed to determine if the byte carries data or control information. The contents of each byte of XGMII data can also be determined by reviewing or processing the XGMII control bit associated with a particular byte of XGMII data.

Step 406 is executed when it is determined that the entire unformatted data block comprises all data characters. At step 406, the unformatted data block is prepended with a synchronization header to form a corresponding formatted data block. The synchronization header can be, for example, a two bit flag of "01." At the conclusion of step 406, the eight bytes of XGMII data received in step 402 have been formatted to produce a unique formatted data block. Accordingly, the generated encoded data block and synchronization header can subsequently be scrambled and transmitted.

Step 408 shows a return to step 402 from step 406 and illustrates the continuous flexible encoding of K characters depicted in FIG. 4. Specifically, step 408 shows a return to step 402 such that a subsequent set of eight bytes of XGMII data is received.

Step 410 is executed when it is determined that one or more received XGMII data bytes contains a control character. At step 410, the current byte of the unformatted data block is reviewed to determine if the current byte contains a data character or a control character. The initial byte examined is the right-most byte or the least significant byte (LSB) of the unformatted data block.

Step 412 is executed when it is determined that the current byte contains a data character. At step 414, the current byte is placed into the right-most unoccupied byte of the formatted data block. For example, when the current byte is the first byte (i.e., the LSB byte) of the unformatted data block, the data byte is placed into the LSB byte of the formatted data block.

Step 414 is executed after step 412. At step 414, the current byte of the unformatted data block is shifted. Specifically, the current byte for examination or inspection is shifted over one byte to the next byte. In essence, the current byte is moved to the next most significant byte of the unformatted data block. Step 410 is then repeated after step 414. Together, steps 412 and 414 represent a first branch of operation. Repeated execution of steps 412 and 414 populates the first set of slots of the encoded data block with the data characters from the unformatted block of data. These slots are sequentially populated from a LSB position to a MSB position of the first set of slots. In doing so, the ordering of the data characters (from LSB to MSB) in an unformatted data block is preserved Step 416 is executed when it is determined that the current byte contains a control character. At step 416, the current byte is recoded and placed into the left-most unoccupied byte of the formatted data block. For example, when the current byte is the first byte (i.e., LSB) of the unformatted data block, the recoded K byte is placed into the MSB of the formatted data block.

The unformatted K code is recoded according to FIG. 3 and Table 3. Specifically, the left-most unoccupied byte of the formatted data block is divided into three fields. A first field is a one bit field indicating if another K code is present within the remaining slots of the unformatted data block. If more K codes are to be placed into the encoded data block, then the one bit field is set to "1." If no more K codes are to be placed into the encoded data block (i.e., the current K code is the last K code), then the one bit field is set to "0." This indicator field occupies the left-most bit of the left-most unoccupied byte of the formatted data block.

A second field is a three bit field indicating the original location of the current K code. The current K code can occupy one of eight possible bytes of the unformatted data block. The three bit position indicator field is used to specify this byte position or lane. For example, if the current K code originally occupied the third byte of the unformatted data block ($K_3$), then the position indicator field will be set to "011." The position indicator field occupies the three bits adjacent to the one bit indicator field.

A third field is a four bit recoded value field. The current eight bit K code is recoded into a four bit value according to Table 3. The third field occupies the far right portion of the left-most unoccupied byte of the formatted data block.

Step 418 is executed after step 416. At step 418, the current byte of the unformatted data block is shifted. Specifically, the current byte for examination or inspection is shifted over one byte to the next byte. In essence, the current byte is moved to the next most significant byte of the unformatted data block. Step 410 is then repeated after step 418. Together, steps 416 and 418 represent a second branch of operation. Repeated execution of steps 416 and 418 populates the second set of slots of the encoded data block with the recoded K characters from the unformatted block of data. These slots are sequentially populated from a MSB position to a LSB position of the second set of slots. In doing so, the ordering of the original K characters (from LSB to MSB) in an unformatted data block is reversed.

Step 420 is executed after each byte of the unformatted data block has been examined. Specifically, step 420 is executed after all eight bytes of the unformatted data block have been formatted by the first branch of operation and/or the second branch of operation.

At step 420, the encoded data block is prepended with a synchronization header. The synchronization header specifies that the encoded data block includes flexibly encoded K characters. The synchronization header can be, for example, a two bit flag of "10." Accordingly, the generated encoded data block and synchronization header can subsequently be scrambled and transmitted.

Step 422 shows a return to step 402 from step 420 and illustrates the continuous flexible encoding of K characters depicted in FIG. 4. Specifically, step 422 shows a return to step 402 such that a subsequent set of eight bytes of XGMII data is received.

The flowchart 400 depicted in FIG. 4 is used to generate any of the encoded data blocks depicted on the right hand side of Table 4 from a corresponding block of unformatted data depicted on the left hand side of Table 4. Therefore, an aspect of the present invention provides a coding scheme for flexibly encoding K codes located in any lane of received XGMII data. Further, the encoding scheme of the present invention generates an encoded payload having the same length as a received data block and scrambles the encoded payload and synchronization header to produce a less disruptive frequency spectrum. As shown in Tables 3 and 4, all possible combinations of control and data codes are accommodated, thereby making the coding scheme of the present invention protocol independent. Further, as shown in Table 3, the coding scheme of the present invention allows for 16 different control codes with 14 being defined.

Additionally, the coding scheme of the present invention enables the flexible encoding of K codes in a manner that is rate independent. Specifically, an aspect of the present invention enables any line rate that produces a N B/(N+2) B code, where N is a positive integer, to be selected for use with the encoding scheme of the present invention. Accordingly, a suitable encoding rate can be chosen based on such factors as final line rate or clock dividers.

The coding scheme of the present invention is not limited to the embodiment depicted in FIG. 2 nor to the operation description depicted in FIG. 4. Rather, it will be apparent to persons skilled in the relevant art(s) from the teachings herein that other embodiments and operational steps capable of flexibly encoding data, comprising at least two types of characters located in any portion of a received block of data, to form an encoded data block are within the scope and spirit of the present invention. Specifically, it is to be appreciated that the coding scheme of the present invention is applicable to the following variations: different types of received data (i.e., data other than XGMII data); differently-sized received data portions (i.e., data portions other than bytes); differently-sized blocks of unformatted data (i.e., blocks comprising other than eight bytes). Overall, the coding scheme of the present invention is not limited to 10 Gbps Ethernet or 10× Fibre channel but can be applied to a variety of data transmission schemes or protocols. Accordingly, the encoding scheme of the present invention can be employed by a block encoder connecting any one of a variety of data transmission devices.

Further, it is to be appreciated that the coding scheme of the present invention is applicable to various line rates other than 64B/66B. Accordingly, the coding scheme of the present invention can attach a synchronization header that is larger than or less than two bits.

Overall, an aspect of the present invention allows (a) the receipt of multiple characters of different types in any location of an unformatted block of data; (b) encoding characters of at least one type such that an original position is recorded, an indication of additional encoded characters is provided and/or an abbreviated representation of the encoded character is provided; and/or (c) fully scrambling a resulting encoded block and associated synchronization header.

Additionally, it is to be appreciated that the coding scheme of the present invention can generate encoded data blocks or payloads comprising two or more sets of slots to hold encoded versions of the two or more types of received data characters. Further, these sets of slots can be disjoint and can be filled according to any mechanism know to an encoder and corresponding decoder (e.g., random insertion, alternating LSB to MSB, etc.).

FIG. 5 illustrates a decoding system 500 of the present invention. The decoding system 500 provides the flexible receipt, decoding and transmission of encoded K codes. The decoding system 500 is intended to act in concert with the encoding system 200 depicted in FIG. 2 and can be modified in accordance with the variations of the encoding scheme discussed above.

As shown in FIG. 5, the decoding system 500 includes a descrambler 502, a synchronizer 504, decoder 506 and a data interface 508. The data interface 508 or a portion thereof can be incorporated into the decoder 506. Further, combinations of the constituent components of the decoding system 500 can be incorporated together into a "block decoder." The descrambler 502 receives a fully scrambled data block 510 of 66 bits. The descrambler 502 descrambles the entire scrambled data block 510 to produce an encoded data block 512. The encoded data block 512 is formatted according to the right hand side of Table 4. The synchronizer 504 uses the encoded data block 512 to extract timing information 514 (e.g., framing and byte position information) of the encoded data block 512. The encoded data block 512 and the timing information 514 are forwarded to the decoder 506.

The decoder 506 uses the timing information 514 and the encoding/decoding scheme of the present invention to decode the encoded data block 512. Specifically, the encoded data block 512 is decoded to produce a block of data 516 that is formatted according to the left hand side of Table 4. The 64 bits of decoded data are accompanied by eight bits of corresponding control data 518. The block of data 516 and associated control data 518 is provided to the data interface 508 for transmission (e.g., over a data transmission line).

The decoding scheme of the present invention is not limited to the embodiment depicted in FIG. 5. Rather, it will be apparent to persons skilled in the relevant art(s) from the teachings herein that other embodiments capable of flexibly decoding data comprising at least two types of characters located in any portion of a received scrambled block of encoded data to form a decoded data block are within the scope and spirit of the present invention. Specifically, it is to be appreciated that the variations of the coding scheme discussed above are applicable to the decoding scheme discussed in conjunction with FIG. 5.

CONCLUSION

While various embodiments of the present invention have been described above, it should be understood that they have been presented by way of example and not limitation. It will be apparent to one skilled in the pertinent art that various changes in form and detail can be made therein without departing from the spirit and scope of the invention. Therefore, the present invention should only be defined in accordance with the following claims and their equivalents.

The invention claim is:

1. A method for encoding a block of data to produce an encoded data black, the block of data comprising a plurality of characters received from a plurality of lanes wherein each character is one of a first type or a second type, the method comprising:

inserting characters of the first type into a first set of slots of the encoded data block;

encoding characters of the second type to produce corresponding encoded characters, wherein the characters of the second type are selectable from at least two of the lanes in the plurality of lanes; and inserting the encoded characters into a second set of slots of the encoded data block.

2. The method of claim 1, wherein encoding further comprises encoding the characters of the second type such that each of the corresponding encoded characters comprises a link field, a location field and a recoded value field.

3. The method of claim 2, further comprising encoding in the link field an indication of an additional encoded character within the second set of slots.

4. The method of claim 2, further comprising encoding in the location field an original location of a character of the second type within the block of data.

5. The method of claim 2, further comprising encoding in the recoding value field an encoded version of a character of the second type.

6. The method of claim 1, further comprising receiving two consecutive transfers of 10 Gigabit Media Independent Interface (XGMII) data, the two consecutive transfers of XGMII data comprising the block of data.

7. The method of claim 1, further comprising attaching a synchronization header to the encoded data block.

8. The method of claim 7, further comprising scrambling the synchronization header and the encoded data black to produce a scrambled data block.

9. The method of claim 1, wherein inserting characters of the first typo comprises sequentially populating the first set of slots from a least significant byte (LSB) position to a most significant byte (MSB) position of the first set of slots.

10. The method of claim 1, wherein inserting characters of the second type comprises sequentially populating the second set of slots from a most significant byte (MSB) position to a least significant byte (LSB) position of the second set of slots.

11. A block encoder, comprising;

a data interface to receive a block of data from a plurality of lanes, the block of data comprising a plurality of characters wherein each character is one of a first type or a second type; and an encoder to insert characters of the first type into a first set of slots of an encoded data block and to insert encoded characters corresponding to characters of the second type into a second set of slots of the encoded data block, wherein the encoder encodes the characters of the second type that are selectable from at least two lanes in the plurality of lanes.

12. The block encoder of claim 11, wherein a length of the encoded data block is equal to a length of the block of data.

13. The block encoder of claim 11, wherein a length of each of the slots of the first and second set of slots is equal to a length of each character of the block of data.

14. The block encoder of claim 11, wherein the encoder sequentially populates the first set of slots from a least significant byte (LSB) position to a most significant byte (MSB) position of the first set of slots.

15. The block encoder of claim 14, wherein the first set of slots comprises a contiguous set of slots.

16. The block encoder of claim 11, wherein the encoder sequentially populates the second set of slots from a most significant byte (MSB) position to a least significant byte (LSB) position of the second set of slots.

17. The block encoder of claim 16, wherein the second set of slots comprises a contiguous set of slots.

18. The block encoder of claim 11, wherein:
a number of slots within the first set of slots is equal to a number of characters of the first type within the block of data; and
a number of slots within the second set of slots is equal to a number of characters of the second type within the block of data.

19. The block encoder of claim 11, wherein each encoded character comprises:
a link field;
a location field; and
a recoded value field.

20. The block encoder of claim 19, wherein the link field provides an indication of an additional encoded character within the second set of slots.

21. The block encoder of claim 19, wherein the location field provides an original location of a character of the second type within the block data.

22. The block encoder of claim 19, wherein the recoded value field comprises an encoded version of a character of the second type.

23. The block encoder of claim 11, wherein the block of data comprises two successive transfers of 10 Gigabit Media Independent Interface (XGMII) data.

24. The block encoder of claim 23, wherein the characters of the second type are K control characters.

25. The block encoder of claim 11, wherein the encoder attaches a synchronization header to the encoded data block.

26. The block encoder of 25, further comprising a scrambler, wherein the scrambler scrambles the synchronization header and the encoded data block to produce a scrambled data block.

27. A block decoder, comprising:
a decoder to decode an encoded data block to produce a decoded data block, the encoded data block comprising a plurality of characters wherein each character is one of an unencoded character or an encoded character, the decoded data block comprising a plurality of slots corresponding to the plurality of characters; and
a data interface to transmit the decoded data block to a plurality of lanes, wherein the data interface may transmit a corresponding slot containing a plurality of encoded characters to at least two lanes in the plurality of lanes.

28. The block decoder of claim 27, wherein a length of the encoded data block is equal to a length of the decoded data block.

29. The block decoder of claim 27, wherein a length of each of the slots of the decoded data block is equal to a length of each character of the encoded data block.

30. The block decoder of claim 27, wherein each encoded character comprises:
a link field;
a location field; and
a recoded value field.

31. The block decoder of claim 30, wherein the link field provides an indication of an additional encoded character within the encoded data block.

32. The block decoder of claim 30, wherein the location field provides an original location of each encoded character.

33. The block decoder of claim 32, wherein the recoded value field comprises an encoded version of each encoded character.

34. The block decoder of claim 33, wherein the decoder generates decoded versions of each encoded character.

35. The block decoder of claim 34, wherein the decoder places the decoded versions of each encoded character into slots corresponding to the original location of each encoded character.

36. The block decoder of claim 35, wherein the decoder places each unencoded character into slots unoccupied by the decoded versions of each encoded character.

37. The block decoder of claim 27, wherein the decoded data block comprises two successive transfers of 10 Gigabit Media Independent Interface (XGMII) data.

38. The block decoder of claim 36, wherein the encoded characters eye encoded K control characters.

* * * * *

UNITED STATES PATENT AND TRADEMARK OFFICE
CERTIFICATE OF CORRECTION

| | | |
|---|---|---|
| PATENT NO. | : 7,274,315 B2 | Page 1 of 1 |
| APPLICATION NO. | : 11/267184 | |
| DATED | : September 25, 2007 | |
| INVENTOR(S) | : Howard A. Baumer | |

It is certified that error appears in the above-identified patent and that said Letters Patent is hereby corrected as shown below:

In the Claims:

At column 14, line 55, "the first typo" should be replaced by --the first type--.

Signed and Sealed this

First Day of July, 2008

JON W. DUDAS
*Director of the United States Patent and Trademark Office*